United States Patent [19]

Knight

[11] 4,143,675
[45] Mar. 13, 1979

[54] TORSIONALLY CONTROLLED SWIVEL JOINT

[75] Inventor: Houston W. Knight, Whittier, Calif.

[73] Assignee: FMC Corporation, San Jose, Calif.

[21] Appl. No.: 904,079

[22] Filed: May 8, 1978

Related U.S. Application Data

[62] Division of Ser. No. 745,133, Nov. 26, 1976, Pat. No. 4,111,465.

[51] Int. Cl.² ............................................. F16L 27/00
[52] U.S. Cl. .................................................. 137/615
[58] Field of Search ............... 285/114, 168, 276, 184, 285/185, DIG. 8; 267/154, 155; 141/387, 388; 248/292, 280, 297; 137/615

[56] References Cited

U.S. PATENT DOCUMENTS

| 628,692 | 7/1899 | Campbell | 285/185 |
|---|---|---|---|
| 2,395,178 | 2/1946 | Fiori | 285/DIG. 8 X |
| 2,557,507 | 6/1951 | Lang, Jr. | 285/184 X |
| 2,592,372 | 4/1952 | Altorfer | 285/114 X |
| 2,694,585 | 11/1954 | Fiori | 284/DIG. 8 X |
| 2,739,779 | 3/1956 | Krone et al. | 285/184 X |
| 3,030,128 | 4/1962 | Versen | 285/185 |
| 3,038,714 | 6/1962 | Klaus et al. | 267/154 |
| 3,378,033 | 4/1968 | Cooley, Jr. | 137/615 |
| 3,458,167 | 7/1969 | Cooley, Jr. | 248/292 |
| 3,957,290 | 5/1976 | Whitby et al. | 285/114 |

*Primary Examiner*—Thomas F. Callaghan
*Attorney, Agent, or Firm*—W. W. Ritt, Jr.; J. F. Verhoeven

[57] ABSTRACT

A torsionally controlled swivel joint having at least one axis of rotation is provided with a torque element, either in the form of a helical torsion spring or one or more torsion bars, completely enclosed within the flow passage of the joint to counteract torsional forces applied to one section of the joint relative to another section. One end of the torque element is rigidly connected to one section of the joint while the other end is rigidly connected to a cylindrical adjustment disc rotatable with and sealed in fluid tight engagement to the other section of the swivel joint. In the preferred embodiment, torsional preloading of the torque element is achieved by a plurality of locking balls in a ball race formed in the mating surfaces of the adjustment disc and swivel joint section. The disc is held in desired angular relationship by loading the desired number of balls on each side of and between a ball stop block removably connected to the adjustment disc and the ball plug removably connected to the associated swivel joint section. Other embodiments of the invention provides means for finely ajdusting the torsional preload of the spring in increments less than the diameter of one locking ball.

4 Claims, 14 Drawing Figures

U.S. Patent  Mar. 13, 1979  Sheet 1 of 5  4,143,675
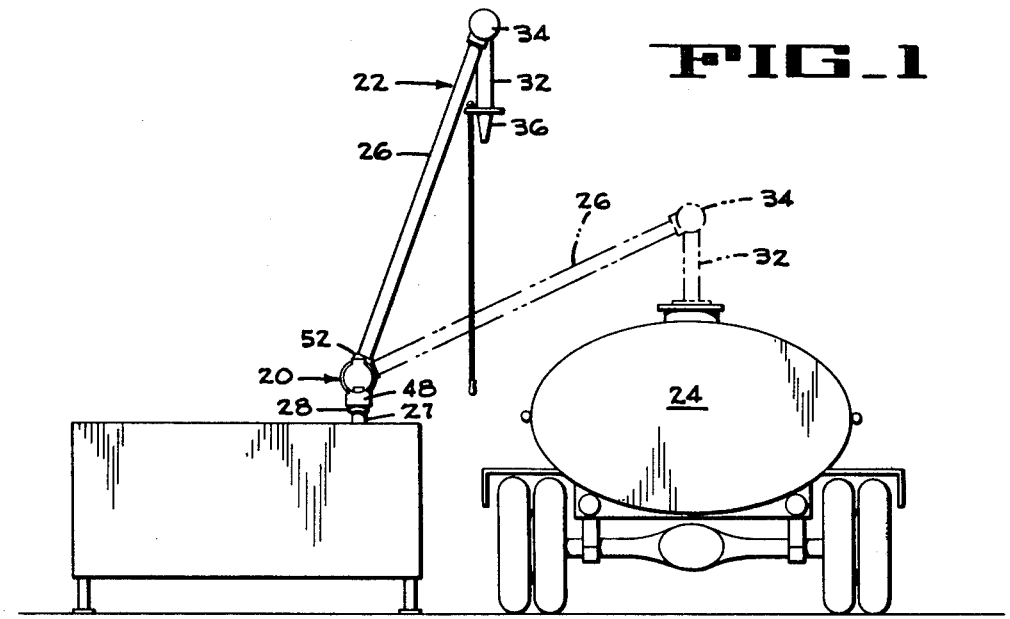
FIG_1
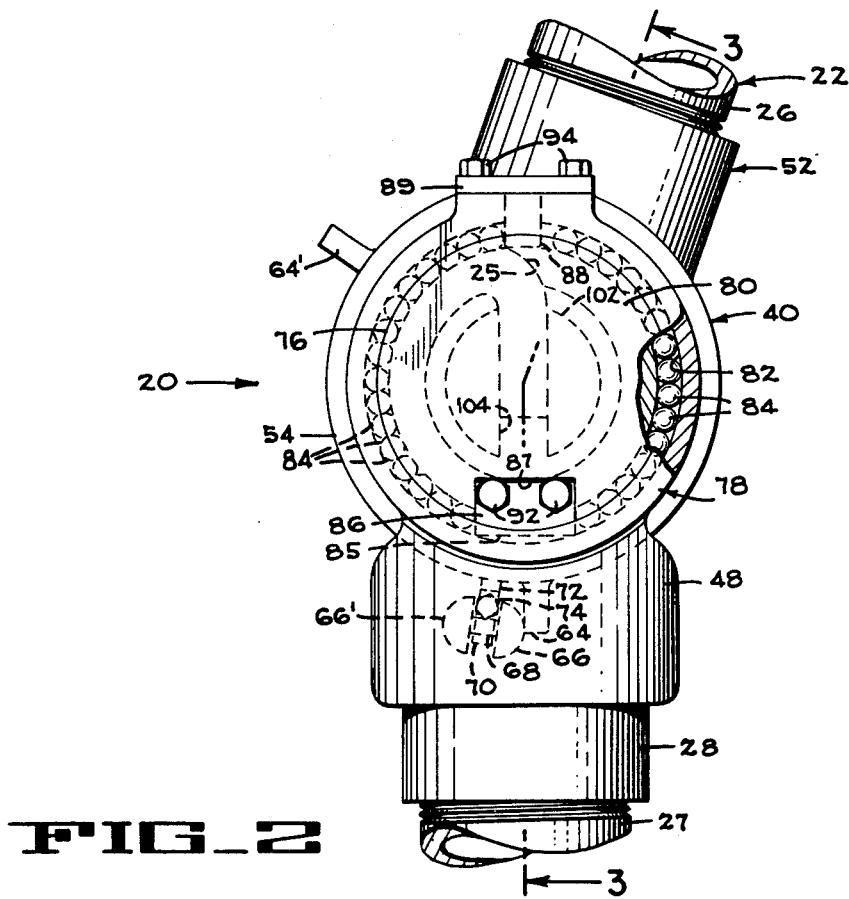
FIG_2

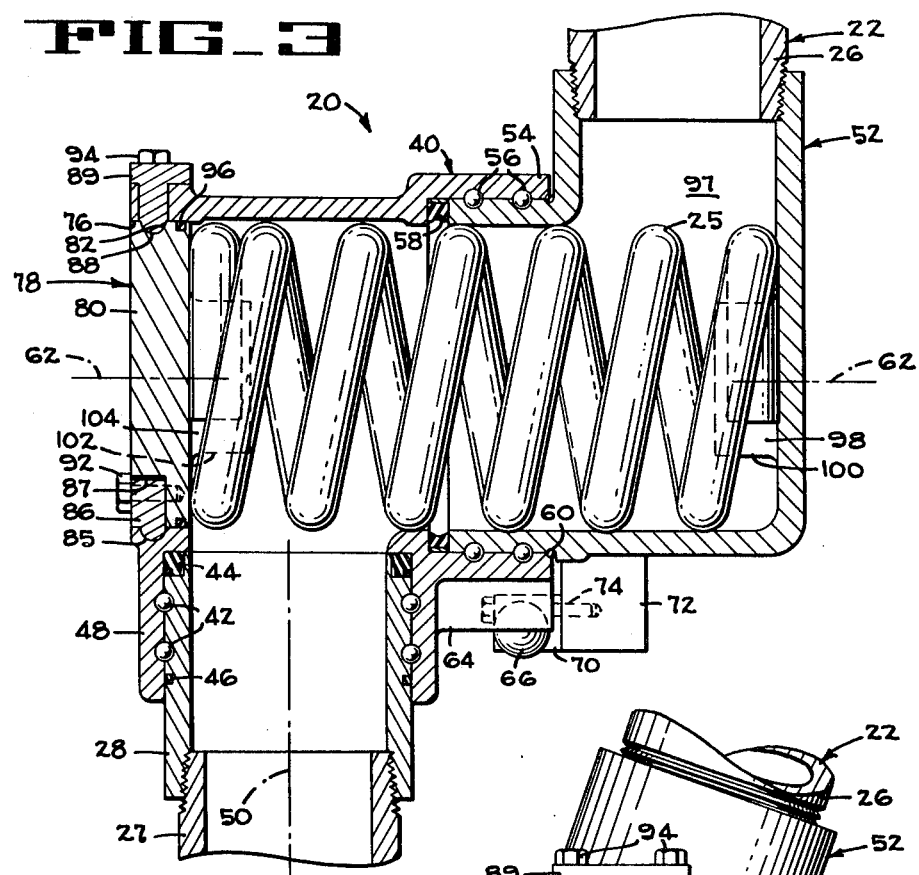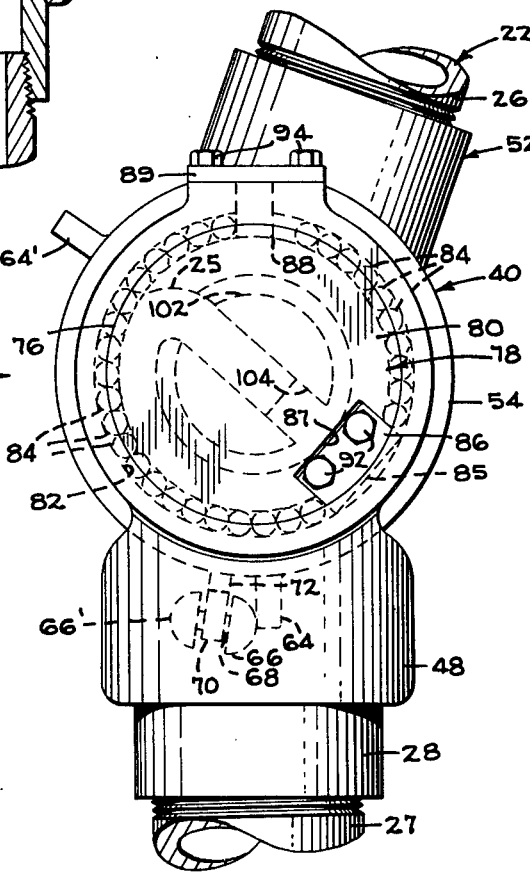

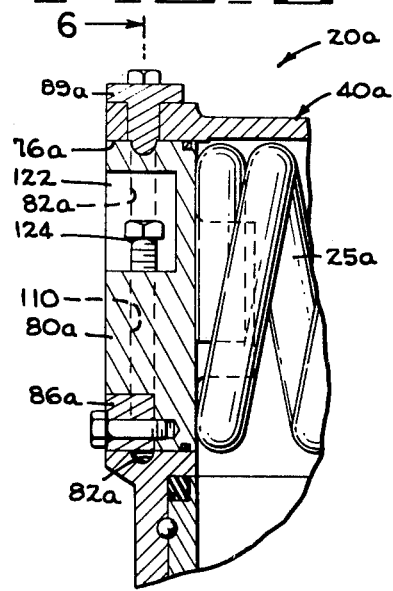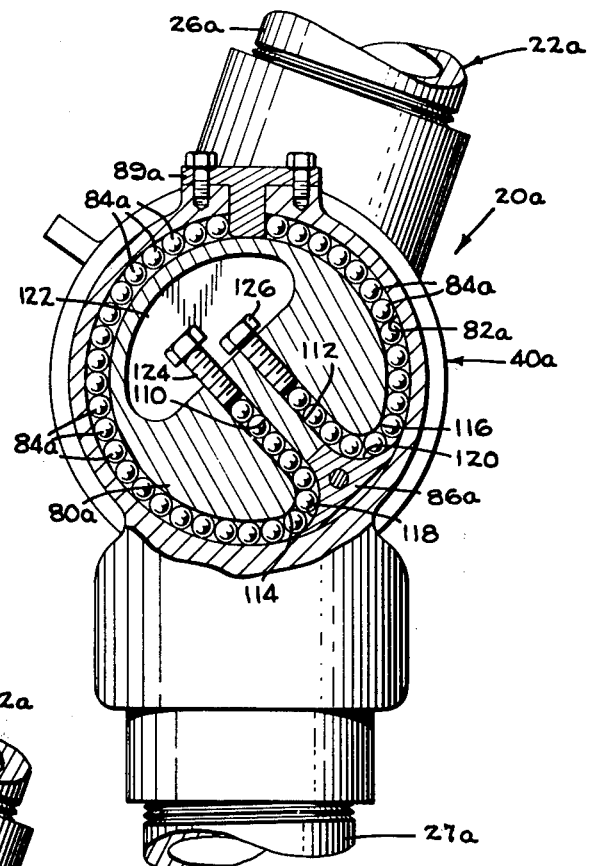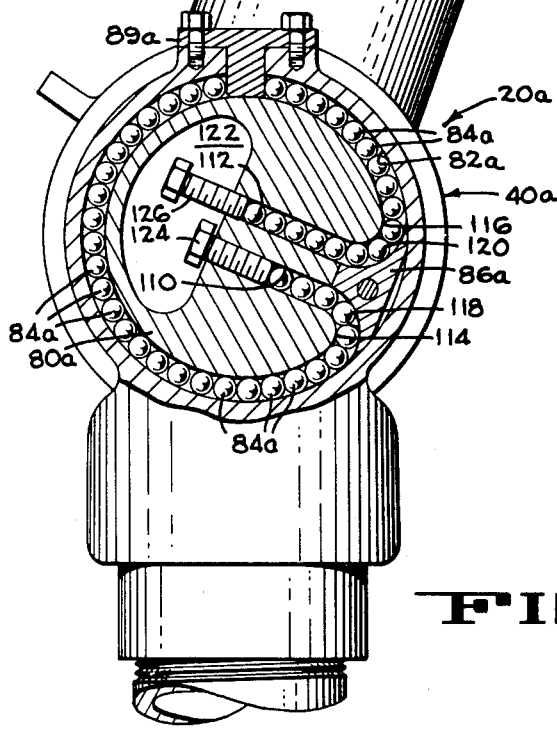

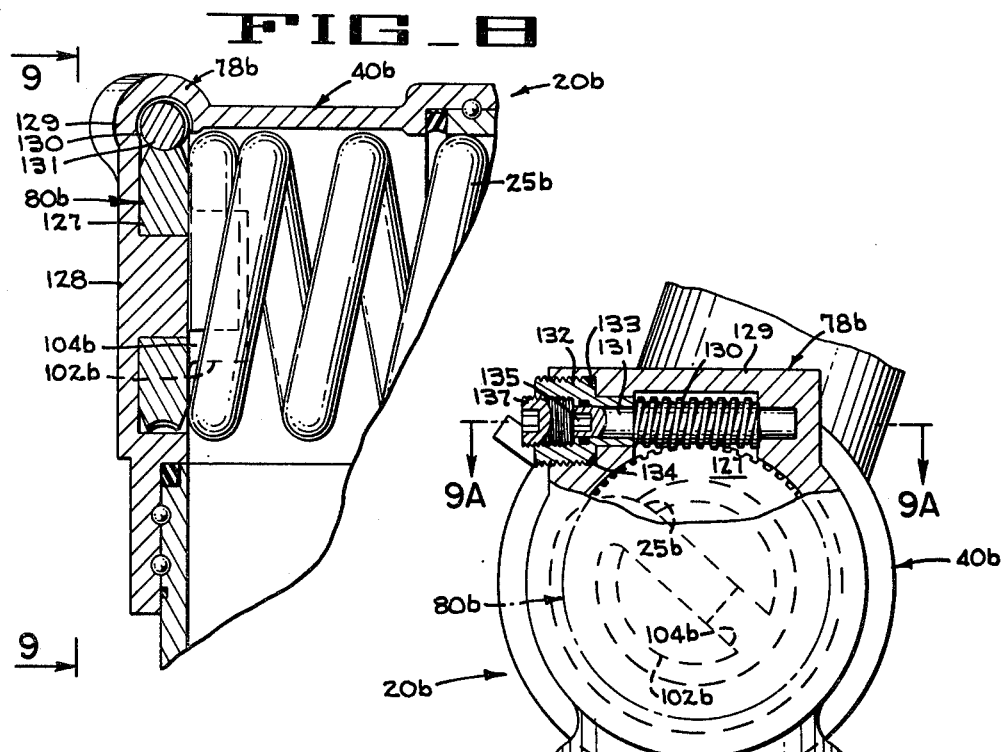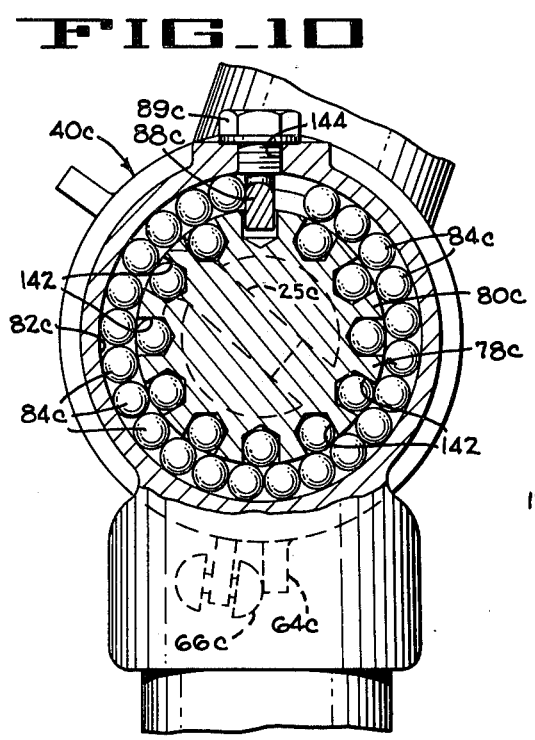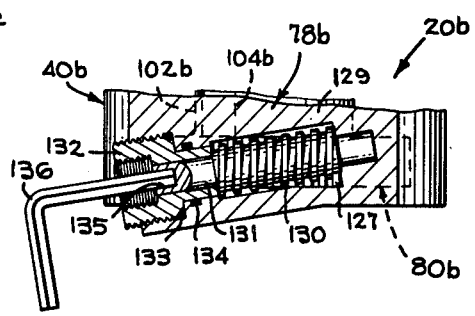

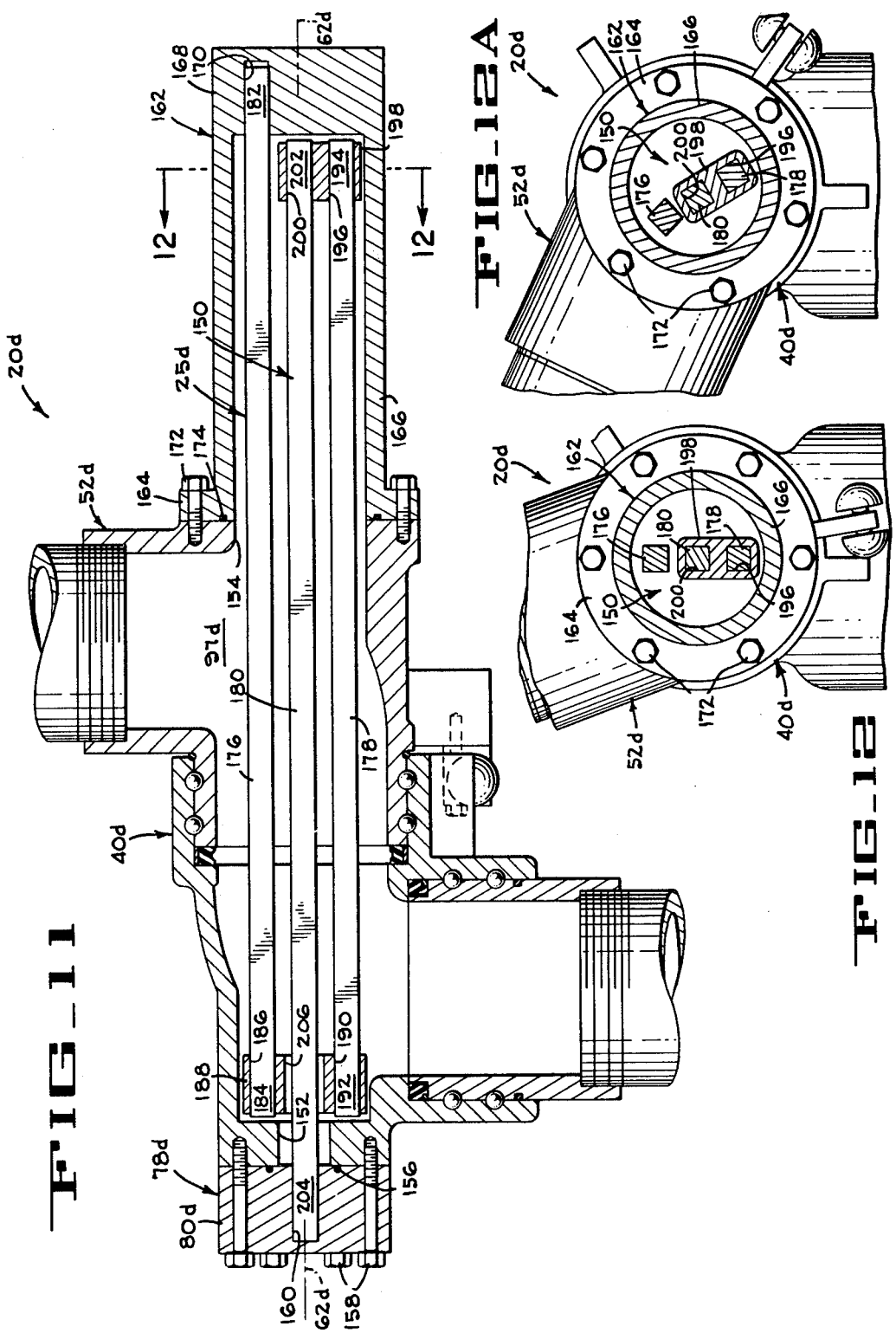

TORSIONALLY CONTROLLED SWIVEL JOINT

This is a division of application Ser. No. 745,133 filed Nov. 26, 1976 now U.S. Pat. No. 4,111,465.

BACKGROUND OF THE INVENTION

1. Field of the Invention

This invention relates to swivel joints, and more particularly relates to torsionally controlled swivel joints having a readily adjustable torque element within the flow passages and between the sections of the joint for counteracting rotative forces acting on one section relative to the other.

2. Description of the Prior Art

In flexible conduit systems such as loading arms for transferring liquids between storage areas and tank trucks, railroad cars, or ships; swivel joints are used to interconnect the inboard loading arm in flow communication with a riser pipe or the like. It is quite common in such conduit systems to balance the rotational forces acting on the two sections of the swivel joint by external counterbalancing weights, hydraulic cylinders, spring and lever arm assemblies, and pulley and cable systems or the like. Such prior art systems include many external parts which are not only expensive but get in the operator's way and sometimes cause physical injury to the operators as well as damage to the equipment itself.

One such prior art device is illustrated in assignee's U.S. Pat. No. 3,378,033 which issued to Cooley, Jr. on Apr. 16, 1968. This patent illustrates a balancing mechanism for a loading arm which uses a torsion spring and lever arm with a ratchet type adjustment device for varying the spring tension as desired. All of the components of the balancing mechanism are external of the flow passages of the loading arm.

A similar external counter balancing mechanism which utilizes a torsion spring is illustrated in U.S. Pat. No. 2,739,779 which issued to Krone et al. on Mar. 27, 1956.

U.S. Pat. No. 2,792,158 which issued to Veitch Sr. et al. on May 14, 1967 discloses a conduit system for draining tanks or the like which includes a two-piece flexible joint. The two pieces of the joint are held together by a tension spring, not a torsion spring, which spring lies within the flow passages of the pumping system.

Torsion springs are also used within the housings of flexible joints of adjustable lamp assemblies or the like for counterbalancing and supporting the weight of the lamp housing. One such device is disclosed in U.S. Pat. No. 2,694,585 which issued to Fiori on Nov. 16, 1954. However, the joint is clearly not a part of a conduit system for flowing fluids.

SUMMARY OF THE INVENTION

A torsionally controlled joint for a flexible conduit system is provided having a torque element, either in the form of a helical torsion spring or one or more torsion bars, disposed entirely within the flow passages of the system. One end of the torque element is anchored to one section of the swivel joint while the other end is anchored to an adjustment disc that is adjusted to any desired angular position relative to the other section of the swivel joint thereby providing the desired torsional tensioning or preloading of the torque element. The periphery of the disc and its mating surface of the swivel joint define an annular ball groove which receives semi-cylindrical end portions of a stop block bolted to the disk, and also receives the semi-cylindrical end portion of a ball plug bolted to the associated swivel joint thereby securing the disc in sealed engagement and from axial movement from its swivel joint section. The portion of the ball groove not filled by the stop block and ball plug is filled with rigid balls thus preventing relative rotation between the disc and the associated swivel joint section during operation. Adjustment of the tension of the torque element is accomplished by removing the ball plug, pivoting the disc relative to the associated swivel joint section to the desired angular position thereby causing the balls to shift from one side of the ball race to the other, and then reinserting the ball plug between the two groups of balls. In a second embodiment of the invention, fine adjustment of the preload on the torque element may be accomplished by engaging the ends of the two columns of stop balls by adjustable cap screws. A third embodiment of the invention uses an irreversible worm and worm wheel adjusting device for finely adjusting the preload.

BRIEF DESCRIPTION OF THE DRAWINGS

FIG. 1 is a diagrammatic side elevation of a loading arm incorporating a first embodiment of the torsionally controlled swivel joint of the present invention.

FIG. 2 is an enlarged side elevation illustrating the torsionally controlled swivel joint in its folded stowed position and with the torque element being a helical torsion spring tensioned to apply a slight force urging a bumper against a bumper stop.

FIG. 3 is a vertical section taken along lines 3—3 of FIG. 2.

FIG. 4 is a view similar to FIG. 2 but with the adjustment disc set for a much higher preloading of the torsion spring.

FIG. 5 is a fragmentary vertical central section taken through a second embodiment of the invention illustrating a modified form of the adjustment disc and adjacent portion of a swivel joint adapted for fine adjustment of the preloading of the torsion spring, the modified disc being positioned to lightly preload the spring.

FIG. 6 is a section taken along the line 6—6 of FIG. 5 but illustrating the adjustment disc set in a position similar to FIG. 2 for high preloading the torsion spring.

FIG. 7 is a section similar to FIG. 6 but illustrating the disc finely adjusted and pivoted about two and one-half ball diameters from the FIG. 6 position, one additional ball being transferred from one side to the other side of the ball plug.

FIG. 8 is a fragmentary vertical section of a portion of a third embodiment of a torsionally controlled swivel joint, which joint is provided with a gear type adjusting and locking device.

FIG. 9 is an end view looking in the direction of lines 9—9 of FIG. 8, certain parts being broken away.

FIG. 9A is a section taken along lines 9A—9A of FIG. 9 illustrating the angular relationship between the worm and worm wheel.

FIG. 10 is a section similar to FIG. 6 but illustrating a fourth embodiment of the invention provided with another type of adjusting device.

FIG. 11 is a central section similar to FIG. 3 but illustrating a fifth embodiment of the torsionally controlled swivel joint with a torsion bar balancing system, rather than a helical torsion spring, encompassed within its flow passages.

FIGS. 12 and 12A are sections taken along lines 12—12 of FIG. 11 illustrating the flexible conduit system in its retracted position and in its loading position, respectively.

DESCRIPTION OF THE PREFERRED EMBODIMENT

The torsionally controlled swivel joint 20 (FIGS. 1-3) of the present invention is illustrated as a component of a flexible conduit system 22 used for loading a tanker truck 24 with fluid such as gasoline, oil or water.

The torsionally controlled swivel joint 20 includes a torque element 25 which is illustrated as a helical torsion spring in the first four embodiments of the invention and accordingly will be referred to as such in describing these embodiments. The torsion spring 25 is connected between an inboard loading arm 26 and a riser pipe 27 having a swivel riser nipple 28 on its upper end. The inboard loading arm 26 is connected to a freely suspended outboard loading arm 32 (FIG. 1) by a second swivel joint 34 of standard well known design, and the outboard loading arm 32 is coupled to the tank truck 24 being loaded, by a standard vapor control coupling 36. When the flexible conduit 22 is not in operation, the preloaded torque element or torsion spring 25 of the torsionally controlled swivel joint 20 maintains the arms 26 and 32 in an upright stowed position as illustrated in solid lines in FIG. 1.

As best shown in FIG. 3, the torsionally controlled swivel joint 20 of the present invention includes a female section 40 that is rotatably connected to the riser pipe 27 by the swivel riser nipple 28. Two series of ball bearings 42 and fluid seals 44 and 46 are disposed between the nipple 28 and an annular mounting flange 48 of the female section 40 permitting rotation of the section 40 about the vertical axis 50 of the riser pipe 27, and dynamically sealing the flange and nipple in fluid tight relationship.

A male section 52 of the torsionally controlled swivel joint 20 is similarly journaled within and dynamically sealed in fluid tight engagement to a second annular flange 54 of the swivel joint 20 by two rows of ball bearings 56 and fluid seals 58 and 60 for rotation about a horizontal axis 62. Rotation of the male section 52 relative to the female section 40 is limited to about 340 degrees by a stop flange 64 (FIGS. 2 and 3) rigidly secured to the female section 40, and a resilient bumper 66. The resilient portion of the bumper 66 is bonded to a capscrew 68 which may be threaded into a block 70 from either side thus selectively permitting the bumper to engage the stop flange 64 in response to either full clockwise or full counterclockwise movement of the male section 52 by the resiliently preloaded torsion spring 25. The block 70 is removably secured to a tab 72 rigidly secured to the male sectin 52 by one or more capscrews 74.

In order to minimize damage to the swivel joint 20 and/or the tanker 24 in the event the torque element 25 should break, a second stop flange 64' (FIG. 2) and a second resilient bumper 66' may be used to limit the maximum downward pivotal movement of the inboard loading arm 26 a desired amount. The second stop flange 64' is rigidly secured to the female section 40 at the desired angular relationship to and in the same transverse plane as the flange 64. The second resilient bumper 66' is secured to the block 70 on the opposite side thereof relative to the bumper 66.

One side wall of the female section 40 is bored at 76 to receive a spring adjusting and locking device 78 which includes a disc 80. An annular ball race 82 is formed in the mating surfaces of the disc and the female section 40 and is substantially filled by a plurality of stop balls 84, a semi-cylindrical portion 85 of the ball stop lock 86 inserted in a slot 87 in the disc, and the semi-cylindrical portion 88 of a removable ball plug 89. The ball stop 86 is secured in the slot 87 in the disc by capscrews 92, and the ball plug 89 is connected to the female section 40 by capscrews 94. When in its operative position, the disc 80 is sealed to the swivel joint section 40 by an O-ring 96 and is held from axial displacement and radial movement by the aforementioned stop balls 84, and semi-cylindrical portions of the stop block 86 and ball plug 89.

The helical torsion spring 25 has its outside diameter slightly smaller than the diameter of the bore 76. Thus, after the disc 80 has been removed from the section 40 of the swivel joint, the torsion spring 25 is inserted into (or removed from) the flow passages 97 in the torsionally controlled swivel joint 20 through the bore 76, and the disc is thereafter inserted into the bore to close the bore in fluid tight engagement. As will be apparent from FIG. 3, the disc 80 must be moved inwardly of the illustrated position thereby momentarily compressing the spring before the ball stop block 86 can be inserted into its illustrated stop position in the disc and ball race 82. Thereafter, the disc is returned to its illustrated position and the stop block 86 is locked in place by the capscrews 92.

One end of the torsion spring 25 is anchored to the male section 52 of swivel joint 20 in a groove 98 of an inwardly projecting cylindrical spring centering hub 100 that is integral with the male section 52 and is concentric with the axis 62 of the spring control swivel joint 20. Similarly, a cylindrical hub 102 is formed integrally with and projects inwardly from the disc 80 and has a groove 104 therein for anchoring the other end of a torsion spring 25.

In order to torsionally preload or change the preload on the spring 25, the torsional load is first removed from the spring, stop balls 84 are loaded into the race 82 on both sides of stop block 86, and the disc 80 is then rotated to the desired angular position for the proper preloading. Angular shifting of the disc 80 without preloading the spring is usually accomplished by removing the bumper 66 and its support block 70 so that the male section 52, disc 80 and spring 25 can be rotated as a unit relative to the female section 40 of the spring control swivel joint 20 with the tab 72 moving counterclockwise (FIG. 2) past the stop flange 64. This rotational spring loading adjustment can be performed either before or after the torsionally controlled swivel joint is inserted into the conduit system 22 (FIG. 1). After the desired angular position has been achieved, the ball plug 89 is bolted to the female section 40 with the semicylindrical portion 88 of the ball plug inserted between adjacent stop balls 84 in the ball race 82 to thereby prevent rotation between the disc 80 and the female section 40 of the swivel joint. The male section 52 is then rotated clockwise (FIG. 2) a sufficient amount to permit reassembly of the bumper 86 to the male section of the swivel joint on the proper side of the stop flange 64.

FIGS. 2 and 4 illustrate the torsionally controlled swivel joint 20 of the present invention in relatively light and relatively heavy torsional preloaded conditions, respectively, with the bumper 66 disposed against the stop flange 64. It will be understood, however, that in some applications of the torsionally controlled swivel joint 20 the bumper need not engage the bumper stop 64. In other applications, the bumper may be entirely removed since the torsion spring 25 will itself act as a stop or anti-tipover device. In this regard, after torsional stress has been relieved in one direction on the spring, continued movement of the male section 52 in that direction will thereafter be resisted by torsional forces exerted by the spring in the opposite direction. Thus, the flexible conduit system 22 may be used to load tankers either on the right of the system or the left of the system provided the bumper 66 is removed.

A second embodiment of the torsionally mounted swivel joint 20a of the invention is illustrated in FIGS. 5-7, and is identical to the first embodiment except that the adjustment disc 80a and stop block 86a are altered to provide a finer adjustment for preloading the torsion spring 25a than was possible in the first embodiment which was limited to angular adjustment increments of one ball diameter. Because of the similarities between the two embodiments, only those parts that differ will be described in detail and equivalent parts will be assigned the same numerals followed by the letter "a". As illustrated in FIGS. 5-7, the disc 80a and bore 76a in the female section 40a are provided with an annular ball race 82a. In addition to the annular ball race 82a, however, the disc is provided with a pair of ball receiving passages 110 and 112 (FIGS. 6 and 7) which are threaded at their upper ends and are gently flaired into the ball race 82a by arcuate surfaces 114 and 116 at their lower ends. The locking block 86a is provided with complementary arcuate surfaces 118 and 120 thus serving to guide the locking balls 84a between the annular ball race 82a and the ball receiving passages 110 and 112. The threaded ends of the passages 110 and 112 open into a cavity 122 formed in the outer surface of the disc 80a. Adjustment screws 124 and 126 are screwed into passages 110 and 112, respectively, and urge the balls into locking engagement firmly against opposite sides of the ball plug 89a.

The torsion spring 25a is initially preloaded to approximately the desired degree in a manner identical to that described in connection with the first embodiment of the invention. If the initial preloading is too great, the adjustment screw 124 is screwed outwardly of the passage 110, and the adjustment screw 126 is screwed further into the passage 112 thereby shifting the stop balls 84a and rotating the disc 80a clockwise until the desired preload is reached. Conversely, if the initial preload is insufficient, the adjustment screw 124 is screwed further into the passage 110 and the adjustment screw 126 is screwed further out of the passage 112 until the desired preload is reached. If the desired preload or pretensioning of the spring 25a cannot be reached within the adjustment range of the two screws 124 and 126, then the entire preload on the spring 25a is first relieved, the ball plug 89a is removed and later reinserted after one or more balls 84a are removed from one side and placed on the other side of the block 89a all as described in connection with the first embodiment of the invention. The two adjustment screws are then again manipulated to achieve the exact desired preloading of the torsion spring 25a.

A comparison of FIGS. 6 and 7 indicates that in FIG. 7 one ball has been moved from the right side to the left side of the loading plug 89a, and that the screws 124 and 126 have been adjusted to increase the torsional load in FIG. 7 equivalent to about a 2½ ball diameter.

In the conduit system 22 illustrated in FIG. 1, the system is manually pivoted about its vertical axis 50 and horizontal axis 62 when the system 22 is being connected to or disconnected from the tank truck 24. During this time, the rotational forces caused by the weight on the inboard arm 26 and components (including the liquid) carried thereby is resisted and substantially balanced by the force exerted by the torsion spring 25 when properly adjusted. Thus, the balanced system may be easily manipulated by an operator without subjecting the operator to injury by external counterweights, levers, and cables or the like. Although the illustrated embodiment of the flexible conduit system 22 is manually operated, it will be understood that larger systems, such as marine loading arms, may be operated with the aid of hydraulic cylinders or the like.

A third embodiment of the torsionally controlled swivel joint 20b is illustrated in FIGS. 8 and 9 and is substantially the same as the first embodiment except for the adjustment device 78b. Therefore, only the differences will be described in detail, and parts of the third embodiment that are equivalent to those of the second embodiment will be assigned the same numerals followed by the letter "b".

The adjusting device 78b includes a disc 80b in the form of a worm wheel 127 having an anchoring hub 102b and groove 104b integral therewith. The worm wheel 127 is journaled on a spindle 128 integrally formed on the closed end wall of the female swivel joint section 40b.

A closed worm housing 129 (FIGS. 9 and 9A) receives a worm gear 130 secured to a worm shaft 131 that is journaled in small diameter portions of the housing 129 and a bushing 132. The bushing 132 is screwed into a large bore in the housing and is sealed thereto and in fluid tight relationship to the housing and shaft by O-rings 133 and 134. A hexagonal socket 135 is formed in the outer end of the shaft 131 for receiving crank means 136 (FIG. 9A) such as an Allen wrench or the like to aid in rotating the worm 130 when adjustment of the tension of the spring 25b is required. If desired, a pipe plug 137 (FIG. 9) may be screwed into the bushing after adjustments have been made for appearance sake and for protecting the worm shaft 131 from the elements.

As indicated in FIG. 9 and 9A, the teeth on the worm wheel 127 are preferably parallel to its axis of rotation thus requiring that the axis of rotation of the worm 130 be other than at 90° to a plane containing the axis of rotation of the worm wheel 127. Stated in another way, the axis of the worm 130 will be angled relative to the plane of rotation of the worm wheel 127.

It will be noted that the preload on the torsion spring 25b may be adjusted at any time by rotating the worm 130 with the aid of crank means 136 and that such adjustment may be made whether or not the spring 25b is under tension.

A fourth embodiment of the torsionally controlled swivel joint 20c is illustrated in FIG. 10 and provides a simplified adjustment device 78c. Since all other components are substantially the same as that disclosed in the first embodiment, only the new adjustment device 78c will be described in detail and parts of the device 78c that are similar to those of the first embodiment will be given the same numerals followed by the letter "c".

The adjustment device 78c includes a disc 80c rotatably received in the female section 40c of the swivel joint 20c and held from axial displacement by a plurality of balls 84c disposed within a ball race 82c formed in the mating surfaces of the disc and swivel joint section 40c. A plurality of locking holes 142 are formed in the periphery of the disc 80c and are each preferably of a size that will accommodate one ball 84c and not unduly obstruct the freedom of the balls in the race 82c. The balls 84c are loaded into the race 82c through a threaded port 144 which is thereafter closed by a threaded ball plug 89c having a locking portion 88c which enters any one of the holes 142 when aligned therewith.

Thus, the disc 80 may be adjusted relative to the swivel joint section 40c by first removing the bumper 66c to permit release of torsional stress on the spring 25c in a manner similar to that described in the first embodiment of the invention. The swivel joint 40c is then pivoted until the plug 89c is aligned with the desired hole 142, the ball is then removed from the hole, and the plug 89c is screwed into the port 144 with the portion 88c in locking engagement with the selected hole. The bumper 66 is then reinstalled after the swivel joint section has first been returned to the proper side of the bumper stop 64c.

A fifth embodiment of the torsionally controlled swivel joint 20d (FIGS. 11, 12 and 12A) is similar to the other embodiments except that the torque element 25d disposed within the flow passage 97d is illustrated as a torque bar balancing system 150 rather than a helical torsion spring as in the other embodiments. Also, a different type of adjustment device 78d and adjustment disc 80d are provided. Accordingly, parts of the fifth embodiment which are similar to those of the first embodiment will be assigned the same numerals followed by the letter "d", and only the new parts will be described in detail.

The swivel joint 20d includes the female section 40d which has a small diameter opening 152 formed concentric with the axis 62d; and the male section 52d having a larger diameter opening 154 therein. The adjustment disc 80d and an O-ring seal 156 is connected in abutting fluid tight engagement against the end wall of the female section 40d by a series of capscrews 158. The inner portion of the disc is provided with a torque element anchoring recess 160, which in the illustrated embodiment is of square cross-section.

A generally hat-shaped housing 162 (FIG. 11) includes a flanged foot 164, an elongated large diameter tubular body 166, and an end closure cap 168 with a square torque element anchoring recess 170 therein. The hat-shaped housing 162 is bolted to the end wall of the male section 52d by a series of capscrews 172 and is sealed thereto by an O-ring 174.

The torque bar balancing system 150 is illustrated as including three relatively short torque or torsion bars 176, 178, and 180 of square cross-section. It will be understood, however, that a single torsion bar or different number of torsion bars may be used depending upon the torsional load applied and the relative angular movement between the male section 52d and female section 40d of the swivel joint 20d.

One end 182 of the torsion bar 176 is anchored from rotation in the anchoring recess 170 of the hat-shaped housing 162. The other end of the bar 184 is non-rotatably secured in a square opening 186 in an annular torque-transfer element 188. Another square opening 190 in the torque-transfer element non-rotatably secures one end portion 192 of the torsion bar 178 while its other square end 194 is held from relative rotation in a square opening 196 in a second torque transfer element 198. A second square opening 200 in the second torque transfer element 198 holds one end 202 of the torsion bar 180 from relative rotation while its other end portion 204 projects through a large hole 206 in the first torque transfer element 188 and is non-rotatably secured in the square anchoring recess 160 in the disc 80d.

When the swivel joint 20d is pivoted through an arcuate range equivalent to that illustrated in FIG. 1, it will be apparent that the three torsion bars 176, 178 and 180 will torsionally twist about their longitudinal axes substantially equal amounts. The disc 80d may be incrementally adjusted relative to the female section 40d to provide the desired preload by removing the capscrews 158, adjusting the disc to the desired position, and thereafter reinserting the capscrews in the appropriate holes in the female section 40d.

One advantage in using torsion bars as described in the fifth embodiment of the invention is that its load versus angle of deflection can be predicted with accuracy. Another advantage of using torsion bars is that the bars operate in the same manner whether torqued in a clockwise or counterclockwise direction.

Although the disc 80d of the adjusting device 78d is illustrated as being bolted to the end of the female swivel joint section 40d, it will be understood that any one of the previously described adjusting devices may be used in place of the disc 80d for anchoring one end of the torque bar balancing system 150.

From the foregoing description it is apparent that the torsionally controlled swivel joint of the present invention includes a torque element, which element may be either a helical torsion spring or one or more torsion bars, disposed within the flow passages of the swivel joint. In the first two embodiments, adjustment means for manually controlling the desired torsional preload of the torque element is achieved by controlling the relative positions of stop balls and cooperating adjustment blocks projecting into a ball race with one block secured to the disc and the other block secured to the section of the swivel joint in which the disc is rotated during adjustment. Other embodiments of the invention disclosed different types of adjustment devices one of which includes an irreversible worm gear and worm wheel device adapted for fine adjustment.

Although the best mode contemplated for carrying out the present invention has been herein shown and described, it will be apparent that modifications and variations may be made without departing from what is regarded to be the subject matter of the invention.

I claim:

1. In a fluid handling flexible conduit system, the combination of a riser pipe communicating with a supply of fluid, a torsionally controlled swivel joint, means connecting said riser pipe in fluid tight engagement to a first section of said swivel joint for rotation about an upright axis, a second section of said swivel joint connected in fluid tight engagement with said first section for rotation about a generally horizontal axis, means defining a loading arm secured to the other section and movable from an upright to a generally horizontal position, a torque element disposed entirely within fluid flow passages in said system, an adjustment disc connected in fluid tight engagement to one of said sections for rotation relative thereto, first anchoring means on said disc for anchoring one end of said torque element, second anchoring means secured to the other swivel joint section for anchoring the other end of said torque element, and means for adjusting and locking said disc in one of a plurality of different positions of adjustment relative to said one section for selectively varying the torsional resistance of said torque element to rotation of one section relative to the other section through a predetermined arc in response to the weight of said loading arm means and the fluid therein.

2. an apparatus according to claim 1 wherein said torque element is a helical torsion spring.

3. An apparatus according to claim 2 and additionally comprising bumper means on one of said sections, a bumper stop on the other section and disposed within the path of movement of said bumper means, and wherein said anchoring means are arranged to preload said torsion spring in a direction to counteract the weight of said loading arm means and with sufficient force to resiliently urge said bumper means against said bumper stop when said loading arm means is in a stowed upright position.

4. An apparatus according to claim 1 wherein said torque element includes at least one torsion bar.

* * * * *

UNITED STATES PATENT OFFICE
CERTIFICATE OF CORRECTION

Patent No. 4,143,675    Dated  March 13, 1979

Inventor(s) KNIGHT, H. W.

It is certified that error appears in the above-identified patent and that said Letters Patent are hereby corrected as shown below:

Abstract, last sentence: change "ajdusting" to --adjusting--.

Column 7, line 14: after "80" insert --c--; no space between "80" and "c";

line 41: change "larger" to --large--.

Column 9, line 11: change "an" to --An--.

Signed and Sealed this

Twenty-ninth Day of July 1980

[SEAL]

*Attest:*

SIDNEY A. DIAMOND

*Attesting Officer*    *Commissioner of Patents and Trademarks*